June 12, 1934.  S. SHAFER, JR  1,962,531
TROLLEY CONVEYER
Filed Sept. 4, 1931
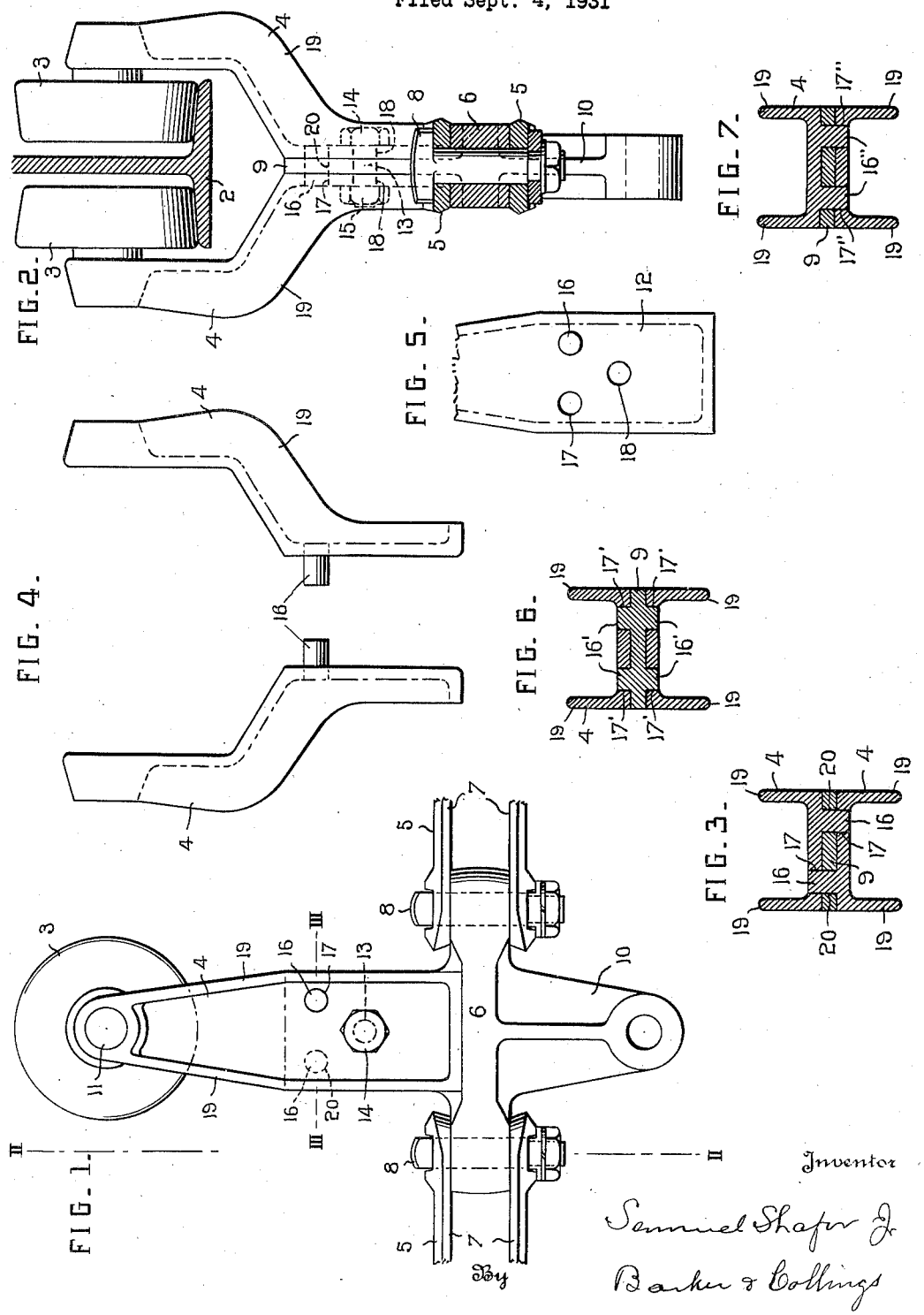

Patented June 12, 1934

1,962,531

UNITED STATES PATENT OFFICE 1,962,531

TROLLEY CONVEYER

Samuel Shafer, Jr., Milwaukee, Wis., assignor, by mesne assignments, to Trolley Conveyors Development Foundation, Inc., Detroit, Mich., a corporation of Michigan Application September 4, 1931, Serial No. 561,249

1 Claim. (Cl. 198—177)

The present invention relates to suspended power-driven conveyers of the overhead trolley type and consists in the specific features of improvement to be hereinafter pointed out and claimed.

In the accompanying drawing:

Figure 1 is a side elevation of a short section of a trolley conveyer embodying the present invention;

Figure 2 is a transverse sectional view thereof taken on the line II—II of Figure 1;

Figure 3 is a horizontal sectional view taken on the line III—III of Figure 1;

Figure 4 is an elevation showing the brackets or trolley frame pieces that carry a trolley wheel detached and separated from each other;

Figure 5 is a broken view of the lower portion of a frame piece such as shown in Figure 4; and Figures 6 and 7 are detail views illustrating alternate forms of the invention.

In the drawing 2 indicates an I-beam, which may be suitably supported so the lower flanges thereof serve as the tracks upon which run the wheels 3 of the trolley by which the loads to be transported by the conveyer are sustained. These wheels are represented as mounted upon shafts 11 carried at the upper ends of frame pieces or brackets 4, a pair of which when united to a special link of the chain constitute part of the trolley frame. A plurality of these trolleys succeeding one another at desired regular intervals along the chain are usually employed. The power-driven chain 5 is represented as being formed of pintle connected links, the axes of articulation of which are vertically disposed. The chain shown is formed of single member links 6 and two member links consisting of separated bars 7, the links being connected by pintles 8,— a form of chain, as to its main features, that is in common use and having many advantages, well recognized. The single piece links that are associated with the trolleys—and which, indeed, become incorporated into the trolley frames,—are special attachment links as represented in the drawing. Each such link 6 is provided with a single centrally disposed web 9 extending upwardly from its central portion. Through this web are formed a plurality of perforations, preferably three; one, 13, to receive a bolt, 14, that, together with its nut 15, unites a pair of wheel-carrying brackets 4 together and to the link 6; and two, 20, to receive studs 16 carried as by the brackets 4. The lower portions of the brackets 4 are drawn inwardly toward each other so as to lie centrally below the beam 2 when the frame is assembled with the wheels 3 upon the tracks of the I-beam, their inner faces being of a size and configuration to lie close against and on opposite sides of the plate or web 9 carried by the link. Each of the brackets is provided with a stud 16. In assembling the brackets to constitute a trolley frame, one of them is placed against the face of the web 9 with its stud projecting through one of the openings 20 therein. This stud is of such length that it projects through the web and extends beyond the face thereof a distance equal to the thickness of the plate or shank portion of the opposite bracket. The opposite bracket is then put in place with its stud 16 extending through the other aperture 20 in the web of the link and into an aperture 17 that registers therewith formed in the shank plate 12 of the opposite bracket; the stud of the first said bracket in the meantime entering the opening 17 in the bracket piece last applied. The connecting bolt 14 is then passed through the registering apertures, 18 in the shank plates 12 of the brackets and 13 in the web of the link.

The brackets 4 are preferably surrounded by edge flanges 19 to give strength to the trolley frame and to form protected recesses in which respectively lie the end of the bolt 14 and the nut 15 that engages with its threaded end.

The special link 6 is represented as being also provided with a downwardly projecting attachment 10 from which a load may be suspended.

A trolley such as described is of very simple construction, requiring but a single loose bolt 14 to unite the two wheel-carrying brackets to each other and to the special link of the chain. The studs, 16, integral with the brackets, insure strength and rigidity to the connection with the link of the chain, prevent any turning of the brackets upon the bolt 14, and assist in the easy assembling of the parts and their correct positioning in assembly. The lower ends of the trolley wheel brackets preferably rest directly upon the central longitudinal portion of the link 6, as represented in Figure 1.

While the form of invention represented in Figures 1 to 5 is that which is preferred principally for reasons that enter into the manufacture of the separate parts of the invention, it should be understood that the present invention is not limited to such specific construction.

In Figure 6 the web 9 of the special link is represented as being formed with integral studs 16' which take the place of the studs 16 carried by the brackets 4 in the arrangement represented in Figures 1 to 5. When the studs 16', integral with the web, are employed, then the flat plate-like stem portions of the brackets will be each provided with a pair of holes 17' to receive the studs 16'. In the form of invention illustrated in Figure 7 one of the brackets employed is represented as being provided with two studs 16'', while the other bracket is formed with two holes 17'' to receive these studs.

The studs which are employed in each of the three constructions illustrated serve to assist in uniting the brackets to the upstanding integral web of the attachment link. This uniting of the separate parts of the trolley is not permanent but rather is easily detachable and is effected by the employment of parts that are not loose, in the sense that the bolt 14 is loose. The studs are integral with either the brackets or the webs, according to the specific form of the invention illustrated. This is a very desirable feature because it permits the easy assemblage of the trolley while the conveyer chain is in working position upon the sprockets and hence under more or less tension.

What is claimed is:

In an overhead trolley conveyer, the combination of a special attachment chain link having an integral central up-standing web, separate trolley wheel-carrying brackets formed with lower flat stem portions adapted to lie in close engagement respectively with the opposite faces of the said web, a single bolt passing through said brackets and web for securely uniting these parts, one bracket being formed, on its inner face, with a pair of studs, and the other bracket and the upstanding web of the special link being each formed with a pair of apertures to receive the said studs when the parts are assembled to constitute a trolley frame.

SAMUEL SHAFFR, Jr.